(12) United States Patent
Laib et al.

(10) Patent No.: US 9,278,762 B2
(45) Date of Patent: Mar. 8, 2016

(54) UNIT LOAD DEVICE VERTICAL UNLOAD SYSTEM

(71) Applicant: Deutsche Post AG, Bonn (DE)

(72) Inventors: Jason Laib, Erlanger, KY (US);
William Winters, Winnetka, IL (US);
Daniel Schlake, Loveland, OH (US)

(73) Assignee: Deutsche Post AG, Bonn (DE)

( * ) Notice: Subject to any disclaimer, the term of this patent is extended or adjusted under 35 U.S.C. 154(b) by 154 days.

(21) Appl. No.: 14/026,881

(22) Filed: Sep. 13, 2013

(65) Prior Publication Data
US 2015/0078867 A1 Mar. 19, 2015

(51) Int. Cl.
*B65G 65/00* (2006.01)
*B64F 1/32* (2006.01)
*B66F 1/00* (2006.01)
*B66F 11/00* (2006.01)

(52) U.S. Cl.
CPC ... *B64F 1/32* (2013.01); *B66F 1/00* (2013.01); *B66F 11/00* (2013.01)

(58) Field of Classification Search
CPC .......... B65G 7/08; B65G 65/00; B65G 67/00; B65G 41/008; B65G 47/57; B64F 1/32
USPC ......... 414/398, 399, 609, 610, 804, 814, 298, 414/331.04, 331.17, 792.8, 277, 278, 281, 414/282, 285, 673, 676, 677, 793.4, 794
See application file for complete search history.

(56) References Cited

U.S. PATENT DOCUMENTS

| | | | | |
|---|---|---|---|---|
| 3,655,075 A | * | 4/1972 | Carder et al. | 414/352 |
| 4,312,619 A | * | 1/1982 | Anderson et al. | 414/347 |
| 5,346,352 A | * | 9/1994 | Ito | 414/400 |
| 5,476,360 A | * | 12/1995 | Liljevik | 414/800 |
| 5,642,803 A | * | 7/1997 | Tanaka | 198/535 |
| 6,286,629 B1 | * | 9/2001 | Saunders | 187/394 |
| 8,596,947 B1 | * | 12/2013 | Stenzel | 414/331.04 |
| 8,801,358 B2 | * | 8/2014 | Kussner | 414/789.9 |
| 2008/0230321 A1 | * | 9/2008 | Csaszar et al. | 187/244 |
| 2013/0287538 A1 | * | 10/2013 | Nyquist | 414/792.8 |

FOREIGN PATENT DOCUMENTS

DE 10308680 A1 * 9/2004 ............ B65G 47/57

* cited by examiner

*Primary Examiner* — Kaitlin Joerger
(74) *Attorney, Agent, or Firm* — Woodard, Emhardt, Moriarty, McNett & Henry LLP

(57) ABSTRACT

The invention relates to a vertical unload system for an unit load device, comprising a framework, the framework delimiting a cargo space arranged on a ground load deck and the framework comprising an unload deck for unloading shipments out of the unit load device and comprising an elevator, whereby the unload deck is arranged distant above the ground load deck and extends in an offset plane adjacent to the cargo space, the cargo space and/or the elevator comprises rollers for loading and unloading the unit load device into and out of the elevator, and the elevator is adapted for vertically elevating the unit load device between the ground load deck and the unload deck such that the unit load device is stoppable at any intermediate stop locations.

20 Claims, 3 Drawing Sheets

UNIT LOAD DEVICE VERTICAL UNLOAD SYSTEM

BACKGROUND OF THE INVENTION

The invention relates to a vertical unload system for an unit load device, comprising a framework, the framework delimiting a cargo space arranged on the ground load deck and the framework comprising an unload deck for unloading shipments out of the unit load device and comprising an elevator. The invention further relates to a method for unloading a unit load device, with said unload system.

A unit load device, often abbreviated as ULD, is a container or pallet used to load luggage, freight, shipments and/or mail on aircrafts. ULDs are preferably used for express shipments to be delivered by said aircrafts, as the ULD allows a larger quantity of cargo, and respectively, shipments to be bundled into a single unit i.e. into the unit load device. The ULD can then be loaded into an aircraft, and respectively, out of an aircraft by specialized motorized means, as known from prior art. Since the shipments are bundled into a single unit this leads to few pieces to load, and respectively, unload to the aircraft and thus saves time and effort.

ULD containers, also referred to as cans or pods, are most often closed containers made of aluminum having at least one door and sometimes built-in refrigeration units.

ULD pallets are often provided with rubbed sheets of aluminum with rims to lock onto so-called cargo net lugs.

The different types of ULDs are standardized, whereby the most common container type is called LD3 having a volume of 4.5 m$^3$. For example, a Boeing 777 can load up to 44 LD3s.

While the loading and unloading of ULDs into and out of aircrafts can be done by various types of motorized means and other sorts of transportation means, making the loading and unloading of the aircraft very economic, the unloading of shipments out of the ULD still has to be done manually, which requires significant time and efforts, and drives the associated costs up. This is especially true if the ULD contains so-called "mixed" shipments, both conveyable shipments as well as forkable shipments, that can only be moved with a lift truck, the unloading of the ULD is a real challenge and even more time consuming and expensive.

BRIEF SUMMARY OF THE INVENTION

It is therefore an object of the invention to provide a system for unloading unit load devices and a respective method for unloading shipments and/or cargo from an unit load device in a safe and ergonomic manner, and much faster compared to the systems and methods known from prior art.

The object is solved by the features of the independent claim. Advantageous embodiments are detailed in the dependent claims.

Thus, the object of the invention is addressed by a vertical unload system for an unit load device, comprising a framework, the framework delimiting a cargo space arranged on a ground load deck and the framework comprising an unload deck for unloading shipments out of the unit load device and comprising an elevator, whereby the unload deck is arranged distant above the ground load deck and extends in an offset and preferably coplanar plane adjacent to the cargo space, the cargo space and/or the elevator comprises rollers for loading and unloading the unit load device into and out of the elevator, and the elevator is adapted for vertically elevating the unit load device between the load deck and the unload deck such that the unit load device is stoppable at any intermediate stop locations.

Thus, the invention provides for a very efficient and ergonomic unloading of express shipments from aviation unit load devices (ULDs), especially if the ULDs contain "mixed" shipments, i.e. both conveyable shipments as well as forkable shipments that can only be removed with a lift truck. For the latter case a significant time reduction has been measured, compared with a prior art system.

For providing such significant time reduction for the unloading of a unit load device, the vertical unload system is characterized by a unique combination of several features. First, the framework comprises an elevator for elevating the unit load device from a ground load deck, preferably arranged on the ground floor in a storage building of an airport, to an above arranged unload deck. Preferably, the unload deck is provided walkable i.e. that an operator is able to walk on the unload deck for unloading shipments. In a further embodiment the cargo space is provided drivable i.e. that a motorized means, e.g. a lift truck, can drive at least partly into the framework for placing the unit load onto the cargo space. Thus, the unit load device can either be placed manually onto the cargo space or by a motorized means.

When the unit load device is unloaded from a tug and/or dolly, which is often done by a specialized motorized means, the unit load device can then be positioned by a human means i.e. an operator across a caster respectively roller deck into the cargo space being delimited by the framework. For supporting this, the cargo space and/or the elevator comprises a customized roller base such that the unit load device can be simply rolled from the caster respectively roller deck onto the cargo space respectively into the elevator. Alternatively, unit load device may be placed by a lift truck onto the cargo space.

When the placement is done, the elevator elevates the unit load device from the ground load deck up to the above arranged unload deck. The unload deck, which is for example arranged 3 to 5 meters above the ground floor, is walkable by an operator for unloading shipments out of the unit load device.

The elevator carrying the unit load device is especially designed to be stoppable at any intermediate stop locations. This means that the elevation of the unit load device relative to the unload deck can be changed in a seamless way. As a result, the vertical unload system provides for a very ergonomic and efficient unloading of the shipments. Thus, as an example, the operator may first unload the topmost layer of shipments in the unit load device and thereafter elevates the unit load device a bit higher relative to the unload deck for unloading the second topmost layer of shipments. This way the operator avoids an unnatural bending and unsafe work functions, as the invention provides very ergonomic unloading of unit load devices.

When all manually carryable shipments are unloaded, the unit load device can be elevated down from the upper unload deck towards the ground load deck such that then bigger, forkable shipments can be unloaded with a lift truck. Various tests have shown that using the described vertical unload system the unload time for unloading an unit load device, especially when loaded with "mixed" shipments, have been reduced from 40 minutes by using prior art systems to only 18 minutes by using the system according to the invention, which equals a significant time reduction by more than 50% and also provides for a cost reduction on a similar level.

According to a preferred embodiment of the invention, the elevator comprises a jog means adapted for fixating the elevator at an elevation and/or at discrete elevations above the ground load deck. With such means the vertical preferably reciprocating conveyer can be stopped at any elevation providing a very ergonomically efficient unloading. Preferably, a programmable logic controller is provided in order to control the elevation of the elevator from the ground load deck towards the seamlessly adjustably elevations respectively discrete elevations.

According to another preferred embodiment the jog means is adapted for fixating the elevator at an elevation of 0 cm, +/−5 cm, +/−10 cm, +/−15 cm, +/−20 cm, +/−30 cm, +/−50 cm and/or +/−100 cm relative to the unload deck above ground. In other words, it is preferred that the jog means is configured such that the elevator can be stopped at various discrete elevations relative to the height of the unload deck and/or at an infinite number of stops. It is therefore clear for the man skilled in the art that there may exist various other elevations and/or that it is also possible that the elevator can be stopped at discrete positions in steps of 0.5 cm, 1 cm, 2 cm, 5 cm and/or 7.5 cm.

According to another preferred embodiment, the unload deck comprises a foldable conveyer, which can be folded out into the framework. This means that if the unit load device is elevated onto the unload deck such that an operator can unload shipments out of the unit load device, the conveyer can be folded out into the framework, which means preferably, that the conveyer ends inside the unit load device. Preferably the conveyer is provided as a roller conveyer or alternatively as a belt conveyer. In such a way, the operator can easily grab shipments from the unit load device and put the shipments onto the roller conveyer for unloading the unit load device without having to walk out of the unit load device. Such a measure further improves the unloading of a unit load device as it saves a couple of steps for the operator to put a shipment from the inside of the unit load device onto a prior art conveyer arranged outside of the unit load device, e.g. three of five meters away.

If the unit load device is elevated from the ground load deck onto the unload deck, for example fixated by the jog means at an appropriate height respectively stop location, the foldable conveyer can be folded-out into the unit load device and thus reaches into the framework with its end. When the unloading is done, the foldable conveyer can be folded again such that it does not reach anymore into the framework, which means that the unit load device can be elevated from the unload deck down to the ground load deck. Preferably the conveyer can be folded from a retracted position into an extracted position, whereby, in the retracted position, the conveyer is folded and thus does not reach into the framework. In the extracted position the conveyer preferably reaches into the framework, and respectively, into a unit load device when elevated onto the unload deck.

Generally, the framework comprising the elevator can be provided in different manners. According to an especially preferred embodiment the framework comprises four vertically extending supports guiding the elevator and delimiting the cargo space. Such supports may comprise steel profiles extending vertically from the ground of a storage building a couple of meters up towards the sailing of the storage building. The vertically extending supports may be fixated with each other by horizontal supports, on which the unload deck might be arranged, preferably in an offset and coplanar plane above the ground load deck. Such an embodiment on one hand allows for a very easy manufacturing of the system and provides on the other hand a very stable framework and support of the elevator.

According to a further preferred embodiment, the elevator comprises a grab means for grabbing the unit load device. Preferably, the elevator comprises four grab means arranged each two of them along the longitudinal sides of the unit load device such that the unit load device can be safely grabbed at two of its longitudinal sides. More preferably, the grab means extends along the insertion direction of the unit load device into the cargo space.

According to another preferred embodiment, the elevator comprises a vertically slidable load deck door arranged on the load deck and/or an unload deck door arranged on the unload deck. The doors are preferably configured such that the access to the cargo space is controlled by the load deck door and the access to the unit load device on the unload deck is controlled by the unload deck door. More preferably, the doors are configured such that, if the elevator is elevated to the unload deck, the load deck door is closed and the unload deck door can be opened and, if the elevator is elevated to the ground load deck, the load deck door can be opened and the unload deck door is closed. This way, the doors provide a very efficient security means, e.g. that an operator standing on the unload deck cannot fall into the elevator chamber provided by the framework if the elevator is elevated to the ground load deck and that the cargo space can only be accessed if the elevator is elevated to the ground load deck.

According to another preferred embodiment, the cargo space and/or the elevator comprise a plurality of rollers arranged behind one another and/or in parallel rows in a insertion direction into the elevator. More preferably, the rollers are provided as long rolls extending perpendicular to the insertion direction into the elevator. Providing such rollers is especially advantageous as it allows for an easy placing of the unit load device into the cargo space respectively into the elevator.

In another preferred embodiment, the system comprises the unit load device, whereby, if the unit load device is arranged on the load deck, the unload deck is arranged above the unit load device. In other words, it is preferred that the unload deck is arranged on a height above the ground load deck that is greater than the height of the unit load device.

In a further preferred embodiment, the before mentioned load deck door and unload deck door are arranged on the same side of the framework. Preferably, the unload deck is arranged on the opposite side of the framework which faces the insertion direction of the unit load device into the elevator. In other words, it is preferred that the manual unloading of shipments out of the unit load device on the unload deck is done on the same side of the framework as forkable shipments can be unloaded from the unit load device to optimize space in the storage building. In an alternative embodiment the unload deck is arranged such that a lift truck placing the unit load device onto the cargo space has to drive below the unload deck onto the ground load deck for reaching the cargo space.

In a further preferred embodiment, the extension of the cargo space equals and/or is greater than the footprint of the unit load device. More preferably, the framework comprises a footprint that allows for different types of unit load devices to be positioned on the cargo space and to be elevated by the elevator. In another preferred embodiment, before mentioned grab means is configured such that unit load devices with different dimensions i.e. different footprints can be grabbed. This way the vertical unload system can be used in a very flexible manner for different types of unit load devices, e.g. in combination with different types of aircrafts.

The object of the invention is further addressed by a method for unloading a unit load device, with an unload system as described before, the method comprising the steps of: a) positioning the unit load device on the cargo space on the ground load deck with preferably with a drivable and/or motorized means, and b) elevating the unit load device from the ground load deck to the above unload deck with the elevator. Alternatively, step a) can be carried out by an operator. For such case a method claim may only include step b) with an optional step a) or even without step a).

The method, which uses the before described unload system, thus provides for a very ergonomic and efficient unloading of shipments out of a unit load device, which is first via step a) placed onto the cargo space, such that then in step b) the unit load device can be elevated from the ground load deck up to the above arranged unload deck. Thereafter, an operator standing on the unload deck can easily unload conveyable shipments out of the unit load device.

According to another preferred embodiment, the method comprises the further step c) unloading the unit load device with the conveyer. Preferably, the method further comprises the step of unfolding the conveyer into the unit load device, when the unit load device is elevated up to the unload deck. This way, conveyable shipments can be unloaded very efficiently by an operator by just grabbing a shipment and placing it onto to the conveyer. Doing so, the operator does not need to walk out of the unit load device for putting the shipment onto a prior art conveyer arranged distant to the unit load device.

According to another preferred embodiment, the method further comprises the steps of d) elevating the unit load device from the above unload deck to the ground load deck, and e) unloading the unit load device preferably with the drivable and/or motorized means. Preferably, such steps are performed when the manual unloading of conveyable shipments has been finished and the unit load device is still positioned in the framework optimizing the use of the framework and avoiding having to reposition the unit load device to unload the forkable shipments. In this regard, the unloading of large forkable shipments is preferably done with a drivable and/or motorized means such as a lift track. In an optional step f) the unloading of the empty unit load device can be done by an operator, similarly as the loading of the ULD into the framework was done. In sum, such a method provides a very advantageous unloading, especially of "mixed" shipments from a unit load device.

These and other objects of the invention will become apparent in connection with the following description in conjunction with the accompanying drawings.

DETAILED DESCRIPTION OF THE INVENTION

Figure 1:
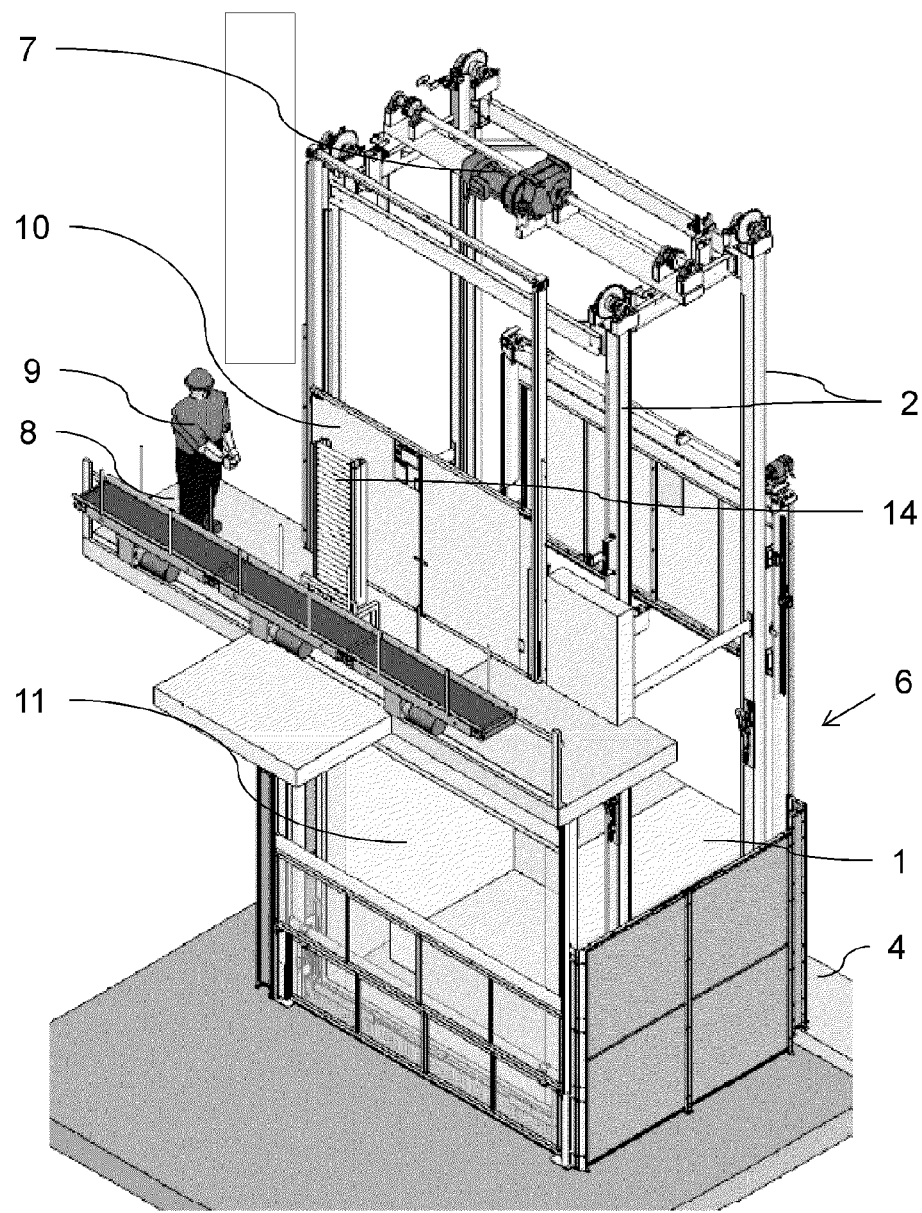
FIG. 1 shows a vertical unload system with an elevator elevated to a ground deck according to a preferred embodiment of the invention in a perspective view.
Figure 2:
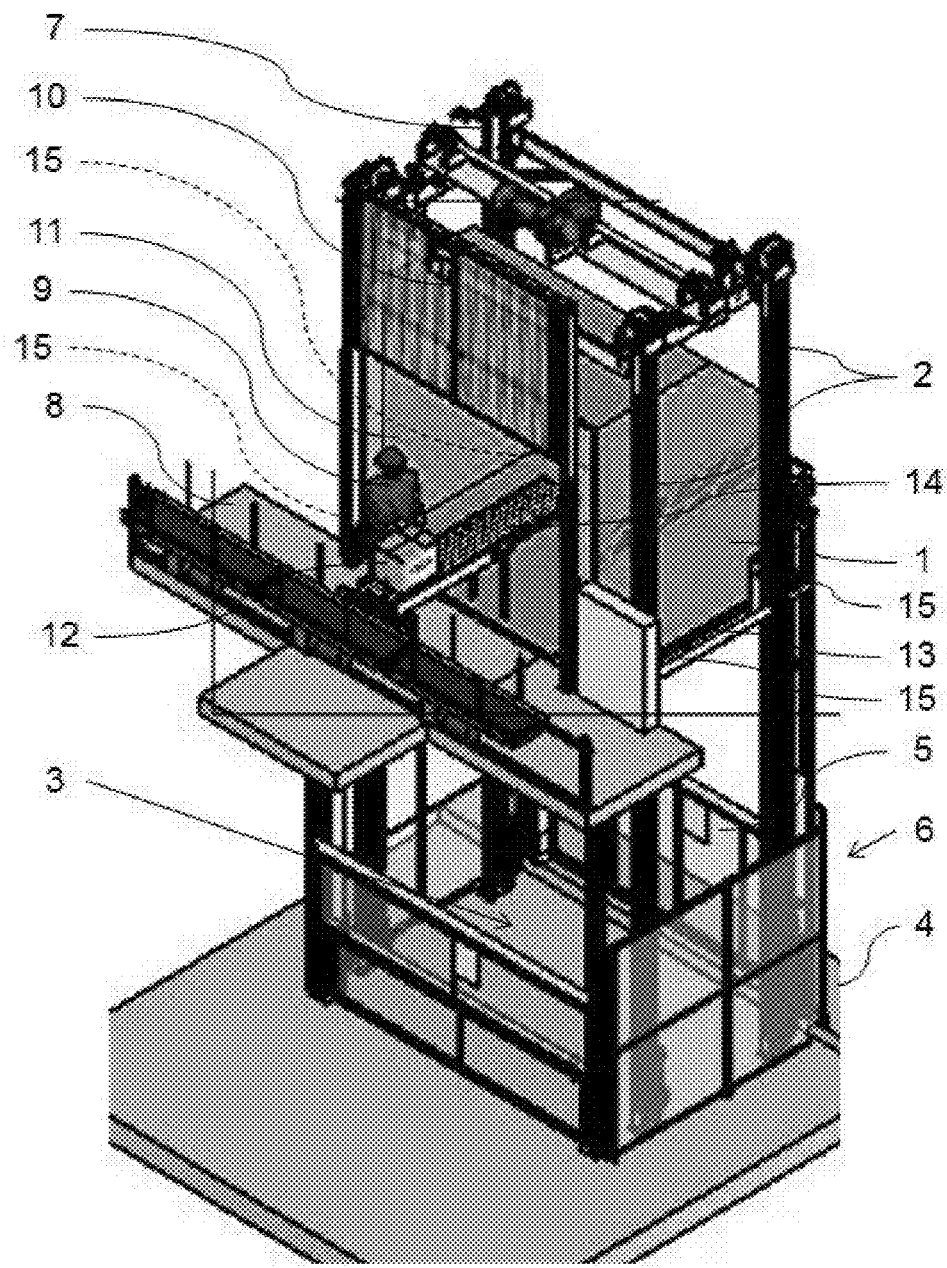
FIG. 2 shows the vertical unload system according to FIG. 1 with the elevator elevated to an unload deck according to the preferred embodiment of the invention in a perspective view.

FIG. 1 and FIG. 2 show a vertical unload system for a unit load device 1 according to a preferred embodiment of the invention in different perspective views.

The vertical unload system comprises a framework 2 made-up by four vertically extending supports 2, which delimit a cargo space 3 arranged on a ground load deck 4. In such a way, the unit load device 1, after being transported from an aircraft, can be placed onto the cargo space 3 by human means, for example transported across a caster and/or ball deck in a storage depot at an airport.

The vertical unload system furthermore comprises a vertically slidable load deck door 5, which has to be opened first i.e. slided upwards such that the unit load device 1 can be pushed onto the cargo space 3 by an operator 9 in insertion direction 6 into the framework 2. Thus, as can be seen from the Figure, the ground load deck 4 is arranged on one side of the framework, while the unit load device 1 is loaded from the opposite side into the framework 2. When the unit load device 1 is placed onto the cargo space 3, as shown in FIG. 1, the load deck door 5 can be closed again, as also shown in said figure.

The vertical unload system also comprises an elevator 7 which is arranged at the framework 2 such that the elevator 7 can elevate the unit load device 1 from the ground load deck 4 towards an above arranged unload deck 8, as shown in FIG. 2. The unload deck 8 is attached to the framework 2 and is made-up as a platform such that an operator 9 can walk onto the unload deck 8. As well as the ground load deck 4 the unload deck 8 comprises a vertically slidable unload deck door 10, basically arranged above the load deck door 5 on the opposite side of the framework 2, which has to be opened first in order to access the inside 11 of the unit load device 1 from the unload deck 8.

In order to facilitate a very efficient and economic unloading of shipments 12 from the inside of the unit load device 1, first the elevator 7 is adapted such that the unit load device 1 can be stopped at any elevation above the ground load deck 4. This means that, for example, the elevator 7 can be stopped at various discrete positions relative to the height of the unload deck 8. The operator 9 may first unload the most upper row of shipments 12 out of the unit load device 1 and thereafter elevate the elevator 7, and thereby the unit load device 1, a bit more up relative to the unload deck 8.

As a result, the operator 9 does not need to unnaturally bend down for grabbing the second upmost layer of shipments 12, as, due to bringing the elevator 7 a bit more up, the second upmost layer of shipments 12 became positioned at the same height as the previously unloaded upmost layer of shipments 12.

The elevator comprises a jog means 13 for seamlessly positioning and fixating the elevator 7 respectively the elevated unit load device 1 at different and intermediate stop locations relative to the unload deck 8. Via the jog means the elevator 7 is also fixable in multiple discrete steps of +/−1 cm above and/or beneath the unload deck 8, or on the same level as of the unload deck 8.

Furthermore, the vertical unload system comprises a foldable conveyer 14 arranged on the unload deck 8, which is shown in FIG. 1 in its folded position and in FIG. 2 in its unfolded position reaching with one end into the framework 2 respectively into the interior 11 of the unit load device 1. This way the operator 9 can easily put shipments 12 onto the foldable conveyer 14.

When the unloading of conveyable shipments 12 has been finished, the conveyer 14 is folded and the unload deck door 10 is closed. A programmable logic controller, not shown, allows then for the elevation of the unit load device 1 from the unload deck 8 down to the ground load deck 4. Arrived in that position, the programmable logic controller opens the load deck door 5 such that forkable shipments 12 can easily be unloaded from the unit load device 1 using a lift truck.

For grabbing different kinds of unit load devices 1 the elevator 7 comprises grab means 15. While unit load devices 1 are generally standardized, there exist different types of unit load devices 1 e.g. LD1, LD2 and LD3 each having different sizes. Each two grab means 15 are arranged on both longitudinal sides of the unit load devices 1 in insertion direction 6 of the unit load device 1 into the framework 2.

Figure 3:
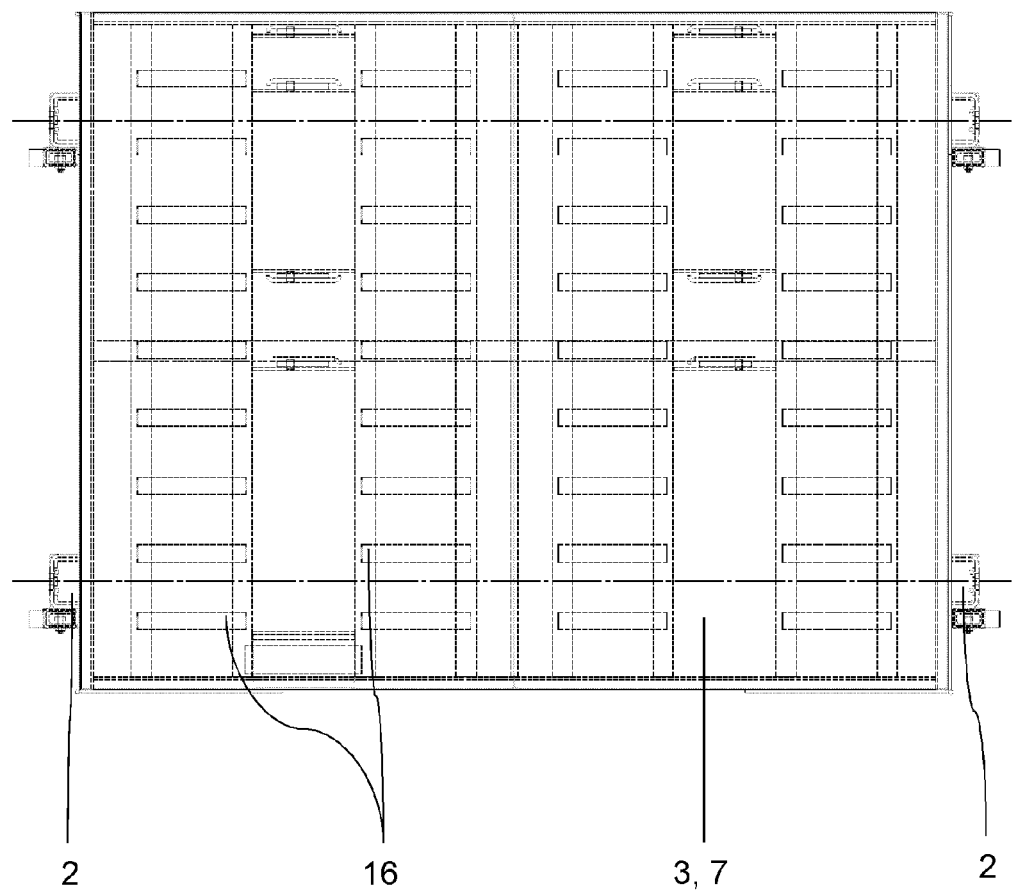
FIG. 3 shows a cargo space of the vertical unload system according to the preferred embodiment of the invention in a top view.

In order to facilitate the placing of the unit load device 1 into the unload system, the cargo space 3 and/or the elevator 7 comprise rollers 16, as seen in detail on FIG. 3, for loading and unloading the unit load device 1 into and out of the elevator 7. The rollers 16 are provided as longrolls and are arranged in parallel rows with a plurality of rollers 16 in each role one behind one another in insertion direction 6.

While the invention has been illustrated and described in detail in the drawings and foregoing description, such illustration and description are to be considered illustrative or exemplary and not restrictive; the invention is not limited to the disclosed embodiments.

Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

REFERENCE SIGNS

Unit load device 1
Framework 2
Cargo space 3
Ground load deck 4
Load deck door 5
Insertion direction 6
Elevator 7
Unload deck 8
Operator 9
Unload deck door 10
Interior 11
Shipment 12
Jog means 13
Grab means 15
Roller 16

What is claimed is:

1. Vertical unload system for an unit load device, comprising:
    a framework, the framework delimiting a cargo space arranged on a ground load deck and the framework comprising an unload deck for unloading shipments out of the unit load device and comprising an elevator, wherein
    the unload deck is arranged distant above the ground load deck and extends in an offset plane adjacent to the cargo space,
    the cargo space and/or the elevator comprises rollers for loading and unloading the unit load device into and out of the elevator,
    the elevator comprises a grab means for grabbing the unit load device,
    the elevator is adapted for vertically elevating the unit load device between the ground load deck and the unload deck such that the unit load device is stoppable at any intermediate stop locations, and
    the elevator comprises a vertically slidable load deck door arranged on the ground load deck and/or an unload deck door arranged on the unload deck.

2. The unload system according to claim 1, whereby the elevator comprises a jog means adapted for fixating the elevator at any elevation and/or at discrete elevations above the ground load deck.

3. The unload system according to claim 2, wherein the jog means is adapted for fixating the elevator at an elevation of 0 cm, +/−5 cm, +/−10 cm, +/−15 cm, +/−20 cm, +/−30 cm, +/−50 cm, +/−100 cm relative to the unload deck.

4. Unload system according to claim 1, wherein the unload deck comprises a foldable conveyer, which can be folded-out into the framework.

5. The unload system according to claim 1, wherein the framework comprises four vertically extending supports guiding the elevator and delimiting the cargo space.

6. The unload system according to claim 1, whereby the cargo space and/or the elevator comprises a plurality of rollers arranged behind one another and/or in parallel rows in an insertion direction into the elevator.

7. The unload system according to claim 1, comprising the unit load device, wherein, if the unit load device is arranged on the ground load deck, the unload deck is arranged above the unit load device.

8. The unload system according to claim 7, wherein an extension of the cargo space equals and/or is greater than a footprint of the unit load device.

9. A method for unloading a unit load device, with the vertical unload system according to claim 1, the method comprising the steps of:
    a) positioning the unit load device on a cargo space on a ground load deck, and
    b) elevating the unit load device from the ground load deck to an above arranged unload deck with an elevator.

10. The method according to claim 9, comprising the further step of:
    c) unloading the unit load device with a conveyer.

11. The method according to claim 10, comprising the further steps of:
    d) elevating the unit load device from the above unload deck to the ground load deck, and
    e) unloading the unit load (1) device.

12. The method according to claim 9, comprising the further steps of:
    d) elevating the unit load device from the above unload deck to the ground load deck, and
    e) unloading the unit load (1) device.

13. The unload system according to claim 1, wherein the elevator comprises four grab means arranged with two grab means on each of the longitudinal sides of the unit load device.

14. The unload system according to claim 13, wherein the grab means extend along the insertion direction of the unit load device into the cargo space.

15. Vertical unload system for an unit load device, comprising:
    a framework, the framework delimiting a cargo space arranged on a ground load deck and the framework comprising an unload deck for unloading shipments out of the unit load device and comprising an elevator, wherein
    the unload deck is arranged distant above the ground load deck and extends in an offset plane adjacent to the cargo space,
    the cargo space and/or the elevator comprises rollers for loading and unloading the unit load device into and out of the elevator,
    the elevator comprises a grab means for grabbing the unit load device, and the elevator is adapted for vertically elevating the unit load device between the ground load deck and the unload deck such that the unit load device is stoppable at any intermediate stop locations, and the cargo space and/or the elevator comprises a plurality of rollers arranged behind one another and/or in parallel rows in an insertion direction into the elevator.

16. Unload system according to claim 15, wherein the unload deck comprises a foldable conveyer, which can be folded-out into the framework.

17. The unload system according to claim 15, wherein the framework comprises four vertically extending supports guiding the elevator and delimiting the cargo space.

18. The unload system according to claim 15, comprising the unit load device, wherein, if the unit load device is arranged on the ground load deck, the unload deck is arranged above the unit load device.

19. The unload system according to claim 15, wherein the elevator comprises four grab means arranged with two grab means on each of the longitudinal sides of the unit load device.

20. The unload system according to claim 19, wherein the grab means extend along the insertion direction of the unit load device into the cargo space.

* * * * *

UNITED STATES PATENT AND TRADEMARK OFFICE
CERTIFICATE OF CORRECTION

| | | |
|---|---|---|
| PATENT NO. | : 9,278,762 B2 | Page 1 of 1 |
| APPLICATION NO. | : 14/026881 | |
| DATED | : March 8, 2016 | |
| INVENTOR(S) | : Laib et al. | |

It is certified that error appears in the above-identified patent and that said Letters Patent is hereby corrected as shown below:

In the Specification

In column 7, at line 43, please insert --Conveyor 14--

Signed and Sealed this
Twenty-eighth Day of June, 2016

Michelle K. Lee
*Director of the United States Patent and Trademark Office*